United States Patent Office 2,946,647
Patented July 26, 1960

2,946,647

INSTRUMENTS FOR RECORDING SHORT INTERVALS OF TIME

Friedrich Richter, Preetz, Holstein, Schleswig-Holstein, Germany, assignor to Electroacustic Gesellschaft mit beschrankter Haftung, Kiel, Germany, a corporation of Germany Filed Sept. 16, 1958, Ser. No. 761,391

9 Claims. (Cl. 346—74)

My invention relates to recording instruments whose stylus travels periodically straight across the record receiving surface at uniform speed. Such recording instruments are suitable for measuring short intervals of time and are used, for example, in echo sounding equipment for providing a record of the time elapsing between the emission of a signal and the receipt of its echo as indicative of depth or altitude.

There are known recording instruments in which a writing stylus travels forward and back across the surface of a paper tape in a direction transverse to the progression of the tape, the stylus being positively actuated by a device only during the forward stroke, whereas in the return direction the stylus is pulled much more rapidly back to the starting position by a return spring. Such abrupt acceleration of the stylus requires a particularly exact guidance and good damping, and is often accompanied by annoying noise. Such a recording device also involves the danger that the abrupt reciprocation of the stylus may cause damage to the recording tape.

Also known are recording instruments in which the stylus is driven by a crank mechanism and is guided for straight-line motion within a given range of its travel. While such devices are well suitable for recording tapes of small width, they require disadvantageously large dimensions, particularly a great over-all width, if tapes of large width are to be used.

In other known recording instruments, the stylus is mounted on an endless belt which moves the stylus on a straight line transverse to the advancing direction of the recording tape and passes about two friction sheaves, of which one is driven to entrain the belt. This results in the occurrence of slip between the driver sheave and the belt, which makes it necessary to release the sonic signal or other starting pulse by means of a control member mounted on the endless belt. A device of this kind involves considerable constructive difficulties. For that reason, such endless-belt type recording devices have been modified by providing the belt with a series of transport holes engaged by sprocket bosses of the driving sheave. As a consequence, the control means for releasing the starting pulse need not be mounted on the endless belt. However, the transport holes of the belt are subject to rapid wear due to the high stresses imposed upon them.

In recording instruments whose stylus is mounted on an endless belt, it is also difficult to tension this belt so tautly and to guide it so accurately that the intensity of the record being produced does not suffer when the instrument is placed into an inclined position, for example due to rolling motion of a seagoing vessel on which the instrument is being used. Hence, these known recording devices demand a great expenditure in material and space for guiding the stylus-carrying belt with the required accuracy and reliability.

It is an object of my invention to eliminate the above-mentioned shortcomings of the known instruments and to provide a tape recorder which, with any desired large width of the recording tape, can be given small dimensions and is superior to the known instruments relative to accurate guidance and useful lifetime of the stylus carrier.

To achieve these objects, and in accordance with a feature of my invention, the stylus is mounted on a rigid carrier structure of elongated shape which is displaceable transverse to the advancing direction of the recording tape or other recording surface and which is coupled through rotatable gear means, such as a single gear or a plurality of rigidly interconnected gears, with a stationary race member extending parallel to the travelling direction of the carrier structure. The rotatable gear means are in frictional or meshing engagement with the movable stylus-carrying structure as well as with the fixed race member so as to roll along the race member when driving the carrier structure. The shaft of the gear means is linked to a reciprocating drive mechanism to periodically reverse the travelling direction of the stylus carrier.

According to another feature of my invention, the stylus of the recording instrument is mounted on a rack member which is displaceable transverse to the advancing direction of the recording surface in parallel and spaced relation to a stationary rack member, both rack members being coupled with each other by one or more spur gears located between the two rack members and in meshing engagement with both.

According to another, alternative feature of my invention, the stylus is mounted on a slidable carrier structure which is displaceable in a direction transverse to the advancing direction of the recording tape and is frictionally coupled by one or more friction wheels with a fixed race member.

According to a preferred embodiment of my invention, the drive mechanism for periodically displacing the above-mentioned gear means comprises a driving member which continuously performs a rotating motion and which travels at uniform speed and on a straight line at least along part of its rotating travel, the shaft of the gear means being journalled on the rotating drive member so as to perform a periodic, reciprocating motion when travelling along with the drive member. The continuously rotating drive member may consist of an endless chain or endless belt which carries a bearing structure for journalling the above-mentioned spur gears, or other gear means that engage the fixed race member as well as the movable stylus carrier. According to another feature of my invention, however, the drive mechanism is designed as a crank drive which has a reciprocating linking rod or pitman member pivotally joined with the shaft of the gear means.

The above-mentioned stylus-carrying structure may be in sliding engagement or otherwise connected with an electric contact device which serves to transmit the received measuring pulse, such as an amplified echo pulse, to the stylus for causing it to produce a mark on the record surface at the moment when such pulse is being received.

Since the stylus carrier performs a reciprocating motion, the stylus is preferably designed as a roller which is pressed by spring force against the surface of the recording tape. This prevents the occurrence of damage to the recording surface. However, if desired, the stylus proper may also be designed as a spring in the conventional manner; but it is then preferable to provide means for lifting the stylus spring off the paper tape during the return stroke of the stylus in order to safely prevent damaging the tape.

The invention will be further explained with reference to the two embodiments of recording instruments according to the invention illustrated by way of example on the accompanying drawings by schematic and perspective illustrations respectively.

Figure 1:
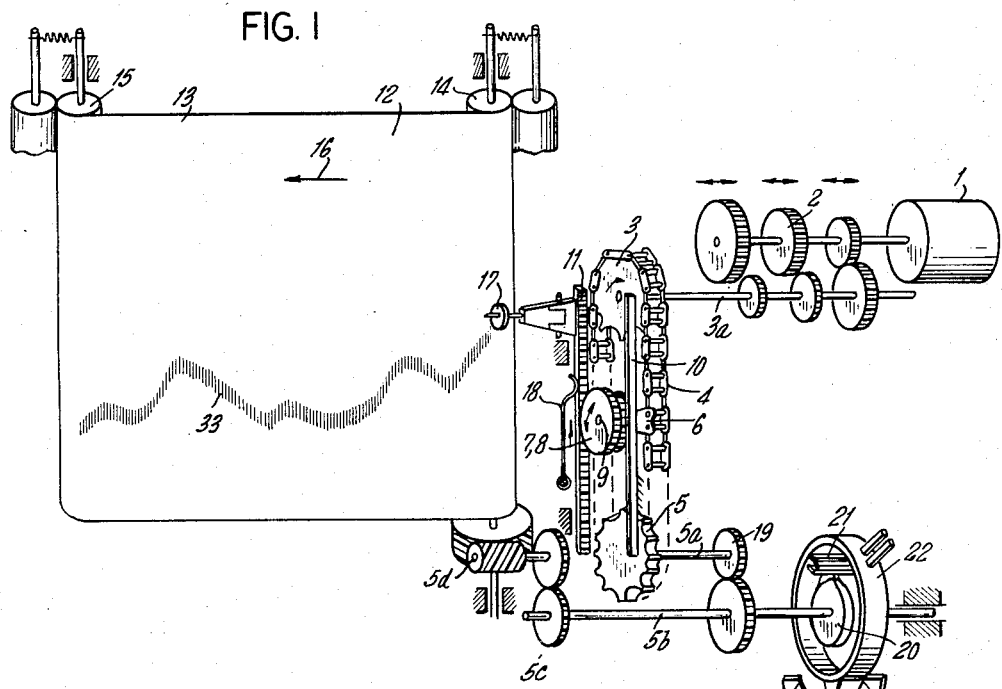
Fig. 1 shows a recording device for short intervals of time in which the stylus carrier is driven by an endless chain.

In the recording instrument shown in Fig. 1, an electric constant-speed motor 1 is connected through a three-step speed-change gear mechanism 2 with the shaft 3a of a sprocket wheel 3 which engages an endless chain 4 meshing with a driven sprocket 5. Mounted on one of the links of chain 4 is a bearing structure 6 which extends from the chain inwardly toward the center line intersecting the respective axes of sprockets 3 and 5. Journalled on the free end of the bearing structure 6 is the shaft 9 of two rigidly interconnected spur gears 7 and 8. Spur gear 7 meshes with a race member consisting of an elongated rack 10 which is stationarily mounted and may be rigidly secured to the housing or frame structure of the instrument. The other spur gear 8 meshes with another elongated rack 11 which extends parallel to the fixed race member 10 and is longitudinally displaceable relative to the housing or frame structure of the instrument. The rack 11 forms a carrier for the writing stylus of the instrument as will be more fully explained below.

During continuous rotation of the endless chain 4 at the uniform speed selected by means of the speed-change mechanism 2, the shaft 9 of gears 7 and 8 travels on the above-mentioned center line from the axis of one sprocket to that of the other. During such travel, the spur gear 7 rolls back and forth along the race member 10 and thus imparts periodic longitudinal displacement to the stylus carrier 11. Mounted on the upper end of carrier 11 is a stylus member which is preferably so pivoted to the carrier 11 that it can be tilted down onto the surface 12 of the recording tape 13. The stylus proper consists of a roller 17 which, when in writing position, is kept in engagement with the recording surface 12 by means of a pressure spring (not illustrated).

The recording tape 13 passes from one roller 14 to another roller 15. Roller 14 is driven from the shaft 5a of sprocket 5 through a spur gear transmission 19, an auxiliary shaft 5b, a spur gear transmission 5c, and a worm gearing 5d. Roller 15 may be driven by means of an auxiliary drive (not illustrated), for example an endless-belt drive connecting the roller 15 with roller 14. The recording tape 13 advances in the direction indicated by an arrow 16. The roller 14 is electrically conducting and is connected through the instruments frame or chassis with one pole of a signal receiver or receiving amplifier (not shown). The stylus assembly, including the roller 17 and the carrier 11, is also electrically conducting but is insulated from the roller 14. A contact spring 18 is in sliding engagement with the carrier 11 and connects the stylus assembly with the other pole of the receiving amplifier. When, during the forward stroke of the stylus 17 transverse to the advancing direction 16 of the recording tape 13, an electric pulse is received, for example as the echo of a sounding pulse previously transmitted, then the voltage pulse effective between stylus 17 and roller 14 causes a spark to puncture the recording tape 13, thus producing a mark on the recording surface. It will be understood that other known means for producing a record in response to an electric pulse may also be employed.

The sprocket 5, aside from transmitting advancing motion to the recording tape, is further connected through the spur gear transmission 19 and the shaft 5b with the actuating cam 20 of a contact device. During each rotation of shaft 5b, the cam 20 temporarily closes a contact 21 which releases the transmitter pulse. The contact device 21 is mounted on a ring 22 angularly displaceable about the axis of shaft 5b. By displacing the transmitter contact 21, the moment at which the transmitter issues a sounding or starting pulse can be shifted relative to the periodic travel path of the stylus. In this manner, the partial sounding range under observation, that is, the selected portion of the total depth being sounded, can be shifted relative to the available recording surface. That is, the diagram recorded on the tape does not represent the full range of depth but only a selected smaller sounding range which may be of particular interest at a time. The selected partial range can be read off a scale 23 relative to which a pointer 24 mounted on ring 22 is displaceable. The total sounding range, however, is dependent upon the chosen speed setting of the multi-step speed-change gear 2.

The above-described recording instrument operates as follows:

When the motor 1 is in operation and drives, through speed-control mechanism 2, the endless chain 4, the bearing structure 6 moves the shaft 9 back and forth between the respective axes of sprockets 3 and 5. The terminal points of the reciprocating motion of shaft 9 coincide with the axes of rotation of the respective sprockets 3 and 5. Due to the reciprocating travel of shaft 9, the spur gear 7 is caused to roll along the fixed race member 10. The other spur gear 8, rigidly connected with gear 7, drives the displaceable stylus carrier rack 11. According to the transmission ratio of the gearing formed by parts 9, 10 and 11, the uniform travel of the bearing structure 6 is transmitted to the stylus roller 17 which thus performs a reciprocating motion on the recording surface in a sense opposed to the motion of the bearing structure 6.

The sprocket 5, acting through transmission 19, drives the cam 20 which temporarily closes the transmitter contact 21 once for each rotation. This takes place when the stylus roller 17 just commences its upward travel on the recording tape 13. A short interval of time later, an echo may be received and amplified, causing an electric pulse to be applied between stylus roller 17 and transport roller 14, thus producing a mark on the tape. As a result, a consecutive sequence of such cyclical operations causes a curve 33 to be written on the recording tape.

Figure 2:
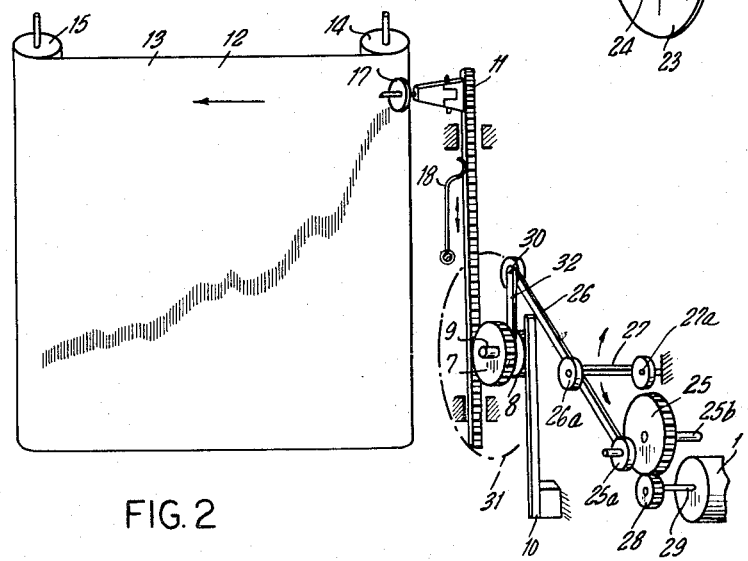
Fig. 2 illustrates a modified recording device in which the stylus carrier is driven by a crank mechanism.

In the recording instrument illustrated in Fig. 2, the stylus, designed as a roller 17, is tiltably mounted on the carrier rack 11 in the same manner as described above with reference to Fig. 1. The stylus roller 17 travels forward and back on the recording tape 13 in a direction transverse to the advancing direction of the tape, also as described above. However, the carrier rack 11 according to Fig. 2 is not driven by an endless member but by means of a crank mechanism.

The crank mechanism comprises a crank wheel 25 which is designed as a spur gear and meshes with a pinion 28 on the shaft 29 of the drive motor 1. The gear 25 carries an eccentric crank pin 25a pivotally joined with a connecting rod 26 which is pivoted at 26a to a linking rod 27 hinged at 27a to the stationary frame structure of the machine. The free end 30 of connecting rod 26, during operation of motor 1, performs a rotating motion on the path of travel indicated by a dot-and-dash line 31. This travel path has a linear portion extending parallel to the longitudinal direction of the rack 11. Pivotally joined to the end 30 of the connecting rod 26 is an arm 32 on whose other end of the shaft 9 of two rigidly interconnected spur gears 7 and 8 is journalled. Gear 7 meshes with a fixed race member 10 consisting of a rack firmly joined with the stationary frame structure or housing of the instrument. The other gear 8 meshes with the displaceable rack 11.

The recording tape 13 passes over rollers 14 and 15 and can be driven by a transmission connecting it with the drive motor 1 as in the embodiment described with reference to Fig. 1. However, in both embodiments the recording tape 13 may also be advanced by means of a separate driving mechanism such as another electric motor.

When using the instrument of Fig. 2 for depth sounding, the arriving echo pulse may be transmitted from the receiving amplifier to the stylus 17 by means of a contact spring 18 in sliding engagement with the movable stylus carrier 11, also as described above with reference to Fig. 1.

Due to the rotating motion of the free end 30 of connecting rod 26, the spur gear 7 journalled on arm 32 is caused to roll along the fixed rack 10. The rotation of gear 7 is transmitted to gear 8 which drives the rack 11 to longitudinally glide in its bearings, thus causing the stylus roller 17 to move forward and back across the surface of recording tape 13. Hence, the motion of the free end 30 of connecting rod 26 in the linear portion of its travel path is uniform, and the travel of the recording stylus 17 during its active forward stroke occurs at uniform speed.

The release of the transmitter contact may be effected by means of a switching device driven from the shaft 25b of the crank gear 25. The transmission of the echo pulse from the receiver or amplifier to the stylus 17 takes place in the manner described above with reference to Fig. 1, so that the stylus roller 17 produces a mark on tape 13 at the moment the echo is received. A notable advantage of the instrument according to Fig. 2 is the fact that the crank mechanism need be designed for a relatively small linear travel only, because this short linear travel is translated by the rack-and-gear mechanism into a greatly magnified linear travel path of the stylus.

Recording instruments according to the invention, such as those described above with reference to Figs. 1 and 2, may be modified by providing them with two recording styli which perform respective reciprocating motions simultaneously, one stylus arriving at its starting position when the other reaches its end position relative to the travel path across the recording tape. Such a modification of the illustrated embodiments is of advantage in cases where during the sounding of short distances, a high frequency of the individual soundings is desired.

Such and other modifications will be obvious to those skilled in the art and do not require any departure from the essential features of my invention as set forth in the claims annexed hereto.

I claim:

1. A recording instrument, comprising record carrier means for advancing a surface member, a stylus for producing a record on the surface member, an elongated carrier structure on which said stylus is rigidly mounted, said carrier structure being displaceable in a travel direction transverse to the advance of the surface member, rotatable gear means peripherally in driving engagement with said carrier structure for displacing said structure, a stationary race member extending parallel to said carrier structure in spaced relation thereto, said gear means being peripherally in engagement with said race member to roll along said race member when driving said carrier structure, drive means having a continuously rotating shaft, and means operably connected between said shaft and said gear means at the axis of rotation of said gear means for periodically moving said gear means in a reciprocating path along said race member.

2. An instrument for recording short intervals of time, comprising record carrier means for advancing a surface member, a stylus for producing a record on the surface member, an elongated carrier structure on which said stylus is rigidly mounted, said carrier structure being displaceable in a straight direction perpendicular to the advancing direction of the surface member, rotatable gear means peripherally in driving engagement with said carrier structure for displacing said structure, a stationary race member extending parallel to said carrier structure in spaced relation thereto, said gear means being peripherally in engagement with said race member to roll along said race member when driving said carrier structure, a drive mechanism having a continuously rotating shaft, and means having a reciprocating part of uniform linear speed operably connected between said shaft and said gear means for periodically moving said gear means along said race member, said gear means being rotatably linked to said part.

3. A recording instrument, comprising record carrier means for advancing a surface member, a stylus for producing a record on the surface member, an elongated carrier structure on which said stylus is rigidly mounted, said carrier structure being displaceable in a travel direction transverse to the advance of the surface member and having a row of rack teeth, a stationary race member having another row of rack teeth parallel to the row of said carrier structure and facing said latter row in spaced relation thereto, rotatable gear means located between said two rows of rack teeth and peripherally in meshing engagement with both, drive means having a continuously rotating shaft, and means operably connected between said shaft and said gear means at the rotation axis thereof for periodically moving said gear means along said race member whereby said carrier structure and stylus are reciprocated relative to the record surface member.

4. A recording instrument, comprising record carrier means for advancing a surface member, a stylus for producing a record on the surface member, an elongated carrier structure on which said stylus is rigidly mounted, said carrier structure being displaceable in a travel direction transverse to the advance of the surface member, rotatable gear means peripherally in driving engagement with said carrier structure for displacing said structure, a stationary race member extending parallel to said carrier structure in spaced relation thereto, said gear means being peripherally in engagement with said race member to roll along said race member when driving said carrier structure, a drive mechanism having a continuously rotating shaft, and means having a continuously rotatable endless transmission member operably connected to said drive mechanism, said endless member having a portion of straight travel direction and uniform travel speed extending parallel to said carrier structure, a bearing mounted on said endless member to rotate together therewith, said gear means being journalled in said bearing, whereby said gear means causes said carrier structure and stylus to reciprocate in said travel direction during continuous rotation of said endless member by said drive mechanism.

5. A recording instrument, comprising record carrier means for advancing a surface member, a stylus for producing a record on the surface member, an elongated carrier structure on which said stylus is rigidly mounted, said carrier structure being displaceable in a travel direction transverse to the advance of the surface member, rotatable gear means having a gear shaft and being peripherally in driving engagement with said carrier structure for displacing said structure, a stationary race member extending parallel to said carrier structure in spaced relation thereto, said gear means being peripherally in engagement with said race member to roll along said race member when driving said carrier structure, a drive mechanism having a continuously rotating drive shaft and two mutually spaced sprocket wheels, at least one of said sprocket wheels being operably linked to said drive shaft for rotation thereby, said gear means being located between said sprocket wheels, an endless chain extending about said sprocket wheels and engaging each wheel for non-slipping relative movement therebetween, said chain having between said two sprocket wheels a direction parallel to said carrier structure, a bearing attached to said chain to travel together therewith, said gear shaft being journalled in said bearing, whereby said gear means causes said carrier structure and stylus to reciprocate at a uniform speed in said travel direction during continuous rotation of said endless member chain.

6. In a recording instrument according to claim 1, said means connected between said shaft and said gear means comprising a crank drive having a rod member linked with said gear means, said rod member being constrainedly driven by said drive means to travel through a path which is linear in one portion thereof, said rod member traveling at a uniform speed in said linear portion.

7. An instrument for recording short intervals of time, comprising record carrier means having a recording tape and drive means of normally constant speed for longitudinally advancing the tape, a stylus engageable with the tape for producing recording marks thereon, a carrier structure on which said stylus is rigidly mounted, said carrier structure forming an elongated rack and being longitudinally displaceable at a right angle to the advancing direction of said tape, a fixed race member consisting essentially of another elongated rack extending parallel to said carrier structure in spaced relation thereto, two rigidly interconnected coaxial spur gears having a common shaft, said two gears being disposed between said two racks and being each in meshing engagement with one of said respective racks, two sprocket wheels having parallel axes respectively and being spaced from each other in a plane parallel to said two sprockets and transverse to said advancing direction of said tape, an endless chain extending about said two sprocket wheels in said plane, drive means having a drive shaft of normally constant speed connected with one of said sprocket wheels for continuously rotating said chain, a bearing mounted on said chain and having a bearing axis located midway between said two racks, said common shaft of said two spur gears being journalled in said bearing for rotation about said bearing axis, whereby said drive means causes said stylus to reciprocate at uniform speed across said tape.

8. A recording instrument according to claim 7, comprising a mounting member rigidly attached to said carrier structure, said stylus having a roller engageable with the tape and a bearing member on which said roller is journalled, said member being pivotally joined with said mounting member, whereby said roller can be tilted into and out of engagement with said tape.

9. An instrument for recording short intervals of time, comprising record carrier means having a recording tape and drive means of normally constant speed for longitudinally advancing the tape, a stylus engageable with the tape for producing recording marks thereon, a carrier structure on which said stylus is mounted, said carrier structure forming an elongated rack and being longitudinally displaceable at a right angle to the advancing direction of said tape, a fixed race member consisting essentially of another elongated rack extending parallel to said carrier structure in spaced relation thereto, two rigidly interconnected coaxial spur gears having a common shaft, said two gears being disposed between said two racks and being each in meshing engagement with one of said respective racks, two sprocket wheels having parallel axes respectively and being spaced from each other in a plane parallel to said two sprockets and transverse to said advancing direction of said tape, an endless chain extending about said two sprocket wheels in said plane, drive means of normally constant speed connected with one of said sprocket wheels for continuously rotating said chain, a bearing mounted on said chain and having a bearing axis located midway between said two racks, said common shaft of said two spur gears being journalled in said bearing for rotation about said bearing axis, whereby said drive means causes said stylus to reciprocate across said tape, and a starting-pulse transmitter having a rotatable cam member and a pulse contact actuable by said cam member during each rotation of said cam member, said pulse contact being angularly adjustable about the axis of rotation of said cam member, and transmission means connecting said cam member with said other sprocket wheel for driving said cam member.

References Cited in the file of this patent

UNITED STATES PATENTS

| | | |
|---|---|---|
| 595,732 | Pitt | Dec. 21, 1897 |
| 1,038,380 | Johanson | Sept. 10, 1912 |
| 1,512,647 | Stevens | Oct. 21, 1924 |
| 2,212,970 | Finch | Aug. 27, 1940 |
| 2,548,847 | Rossman et al. | Apr. 10, 1951 |
| 2,597,199 | Stamper | May 20, 1952 |
| 2,610,244 | Wolf | Sept. 9, 1952 |
| 2,715,055 | Fryklund | Aug. 9, 1955 |